Patented May 29, 1923.

1,456,509

UNITED STATES PATENT OFFICE.

ALFRED MAI, OF MUNICH, GERMANY.

PROCESS OF MAKING ARSENICAL SOLUTIONS.

No Drawing.    Application filed September 1, 1921.   Serial No. 497,726.

*To all whom it may concern:*

Be it known that I, ALFRED MAI, citizen of Germany, residing at Munich, Bavaria, Germany, have invented certain new and useful Improvements in Processes of Making Arsenical Solutions; and I do hereby declare the following to be a full, clear, and exact description of the invention, such as will enable others, skilled in the art to which it appertains, to make and use the same.

The present invention relates to a process of making arsenical solutions to be used against certain animal pests such as wood-infecting and destroying insects.

Aqueous solutions of arsenical acids and their alkali metal salts and watery suspensions of insoluble arsenical compounds have been proposed as spraying fluids and for impregnation and other treatment. Processes are also known in which arsenical compounds are, together with tar oils and other organic substances, used as protective means against insects. There are further known varnishes and additions to coats and paints, specially intended for vessels, in which arsenic is contained, chemically combined with artificial resins, the products of condensation of phenols and formaldehydes.

As means for the impregnation of wood the aqueous arsenical solutions mentioned have the disadvantage in that they will easily be washed out by rain water. The suspensions of arsenical compounds in water or in organic fluids do not penetrate into the wood to a sufficient extent, because the suspended particles fill and obstruct the pores. The employment of organic mediums with inorganic substances which are not soluble therein, requires a plurality of successive impregnations and interposed dryings, and these coats or paints do not penetrate deep enough into the wood. The same is true of the aforementioned arsenical artificial resins, which, moreover, essentially increase the inflammability of the wood treated.

It is the object of the present invention to remove all of these disadvantages by a heretofore unknown solution in organic substances of arsenical compounds, insoluble under ordinary conditions.

It has been found that arsenic acids, sulfides of arsenic, Schweinfurt or Paris green and other arsenical compounds or mixtures may be brought in to solution to a large extent by the action of halogen inorganic substances or compounds with easily detachable halogen atoms, as, bromine or tribromide of arsenic, or with organic halogenical compounds or with aliphatic or aromatic bodies containing several substituted halogen atoms, as phthalylchloride, tribromacetic acid, tetrachlornaphthalene or mixtures thereof in most of the organic solvents, as acetone, ether, alcohol, amylacetate, ethylacetate, benzine, benzol, tar-oils, petroleum, etc., or in mixtures of any of these substances.

Solutions of this kind have the advantage that they completely penetrate the wood in one single process, that they are not washed out and that according to the solvent selected they unite in themselves insecticidal and fungicidal qualities.

Moreover, they permit the solution of inorganic preservers, as naphthalene, anthracene, phenols, nitro-compounds, alkaloid salts, resins and the like, with the sole exception of the free bases; they are also solvents of sulfur.

With solutions referred to the wood may be impregnated by any of the known methods and they are particularly suited for the employment of vacuum and pressure.

The following are a few ways of carrying out the present invention:

First. Six parts of arsenic tribromide may be fused, one part of arsenic trisulphide being gradually added, and the heating continued until there is a complete solution. Then sixty units by volume of ethylacetate may be added with gentle heating and the result will be a yellow-red clear solution.

By diluting this solution with water, adding a quantitiy of slaked lime, sufficient for the neutralization of the arsenic bromide, a liquid for spraying plants will be obtained. A uniform, finely distributed suspension of arsenic trisulphide and arsenite of calcium will be formed this way.

Similar solutions will be obtained in a similar way from:

Second. One part of arsenic trisulphide, three parts of phthalylchloride and sixty units of volume of carbon tetrachloride;

Third. One part of arsenic trisulphide, four parts of tribromacetic acid and sixty units of volume of acetic ether with four tenths parts of dinitrophenol;

Fourth. One part of arsenic trisulphide, four parts of tetrachlornaphthalene and sixty units of volume of carbolineum;

Fifth. One part of Schweinfurt green, four parts of trichloride of arsenic and sixty units of volume of acetone.

During the fusion a violet-colored separation will be obtained by the last-mentioned combination, which dissolves readily in any organic solvents.

Sixth. One part of arsenic trisulphide may be mixed with so much paraffine-oil that a thick, pappy mass will be obtained. To this there may be added one part of bromine and the mass may be cautiously heated until the arsenic trisulphide has been entirely dissolved which will take a few minutes. At last about sixty units of volume of paraffine-oil or any other solvent, as, for instance, toluol, may be added.

What is claimed is the following:

A process, of making arsenic solutions in which the arsenic compounds are fused together with halogen compounds and the fusion is dissolved in organic solvents.

In testimony whereof I hereunto affix my signature in the presence of two witnesses.

Dr. ALFRED MAI.

Witnesses:
 PAUL DREZ,
 RICHARD LUZ.